Patented Aug. 29, 1933

1,924,227

UNITED STATES PATENT OFFICE 1,924,227

ARTIFICIAL RUBBER

Walter Bock and Eduard Tschunkur, Cologne-Mulheim, Germany, assignors to I. G. Farbenindustrie Aktiengesellschaft, Frankfort-on-the-Main, Germany, a Corporation of Germany No Drawing. Application September 12, 1929, Serial No. 392,268, and in Germany September 21, 1928

15 Claims. (Cl. 260—6)

The present invention relates to new artificial rubber-like masses and to a process of preparing same.

We have found that rubber-like masses of valuable technical properties can be obtained from butadiene hydrocarbons, such as butadiene, isoprene, dimethyl-butadienes, analogues or homologues thereof, etc., by polymerizing the same in the presence of water with the addition of such a salt of an organic base with an organic or inorganic acid, as is capable of forming emulsions with butadiene hydrocarbons in aqueous solution.

In accordance with the present invention, for example, salts of the N-mono and di-carboxylic acid esters of asymmetrically substituted alkylene diamines or of the partially acylated derivatives of the alkylene diamines or N-alkyl compounds thereof and other bases are employed. These substances render possible the almost quantitative conversion of emulsified hydrocarbons into rubber-like masses in a short time. Depending on the conditions of working the synthetic rubber-like masses are thereby obtained, wholly or in part in the form of artificial latex-like emulsions, from which the rubber separates on the addition of alkalies, while acids as a rule do not cause coagulation. In this manner aqueous latex-like emulsions of synthetic rubber-like masses, are obtained which, in contradistinction to other known artificial or natural varieties of latex, are stable towards organic or inorganic acids to a far reaching extent with the result, that new important technical fields of application become available. Obviously the polymerization can be carried out with or without the addition of other active substances and emulsifying agents, such as, for example, albuminous compounds, electrolytes, compounds yielding oxygen and the like, in particular also in the presence of acids, since the emulsifying agents specified likewise possess a high emulsifying action even in acid solution. Thus a means is afforded of polymerizing rubber forming hydrocarbons according to the emulsifying process in an acid medium.

The polymerization may be performed, for example, by adding the butadiene hydrocarbons to water with the addition of one or more of the salts above mentioned and by shaking the mixture in a closed vessel, preferably at elevated temperature, for instance, at a temperature between about 40–100° C.; but it is to be understood that also lower or higher temperatures are operable in most cases and are therefore within the limits of our invention. When working within the temperature ranges mentioned, polymerization will be complete within a period of a few days to a few weeks, whereas when working without the addition of the water soluble salts above referred to, the polymerization process will require months or even some years.

The amount of salts of organic bases to be added varies in the widest limits depending upon the character of the respective salts as well as upon the character of the hydrocarbon to be polymerized and on the amount of water used, but generally even rather small amounts, say about 1% or more, (calculated upon the amount of water) are sufficient to yield valuable polymerizates in a rather short time and in a good yield.

The invention is illustrated by the following examples without being restricted thereto.

*Example 1.*—200 parts by weight of isoprene are shaken with 3 parts by weight of the hydrochloride of diethylamino-ethyl-oleylamide (CH₃—(CH₂)₇—CH=
CH—(CH₂)₇.CO.NH—CH₂—CH₂.N(C₂H₅)₂)

(obtainable, for instance, by condensing oleic acid chloride with asymmetrical N-diethyl-ethylene diamine) in 100 parts by weight of water at 65° C. After a few days the acid-stable synthetic latex is formed in almost quantitative yield together with small quantities of solid constituents.

When replacing in this example the isoprene by butadiene or when applying instead of the hydrochloride the acetate of diethylamino-ethyl-oleylamide, similar results are obtained.

*Example 2.*—2.5 parts by weight of diethylamino-ethoxy-oleyanilide-chlorohydrate

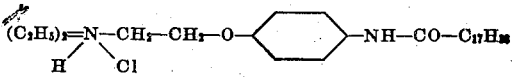

(obtainable, for instance, by condensing β-diethylaminoethoxyaniline with oleic acid chloride) are dissolved in 97 parts by weight of water, the solution is emulsified with 5 parts by weight of 1/1 n-acetic acid and 65 parts by weight of butadiene-(1.3) and polymerization is performed by heating the emulsion to 60° C. for 3 days while shaking. A viscous paste of polymerized butadiene is thus obtained in a nearly quantitative yield, which can be dispersed with water to form a latex like liquid. The latex can be caused to coagulate by freezing out or by means of alkalies.

When replacing in this example the butadiene by isoprene or 2.3-dimethylbutadiene-(1.3) the corresponding vulcanizates are likewise obtained in quantitative yield.

*Example 3.*—5 parts by weight of μ-pentadecyl-glyoxalidine-chlorohydrate of the probable formula

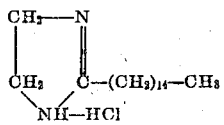

(obtainable, for instance, by condensing stearic acid imido-methylether

with ethylendiamine) are dissolved in 95 parts by weight of water, emulsified with 5 parts by weight of 1/1 n-acetic acid and 65 parts by weight of butadiene-(1.3) and caused to polymerize by heating to about 60° C. for 3 days while shaking. A latex like cream is obtained, containing the polymerizate in a yield of 80–90%.

When replacing the butadiene by isoprene or 2.3-dimethylbutadiene-(1.3) the yield of polymerizate becomes quantitative.

Obviously, instead of starting with only one hydrocarbon, also mixtures of two or more rubber forming hydrocarbons may be used with the result that in this case mixed polymerizates of technically valuable properties are also obtainable in a nearly quantitative yield. For instance, in Example 1 the 200 parts of isoprene may be replaced by a mixture of 75 parts by weight each of butadiene-(1.3) and 2.3-dimethylbutadiene-(1.3) or by the corresponding mixture of isoprene and 2.3-dimethylbutadiene or by a mixture of 50 parts by weight each of butadiene-(1.3), isoprene and 2.3-dimethylbutadiene-(1.3).

We claim:—

1. Process which comprises emulsifying a butadiene hydrocarbon with water and a salt of an organic base as an emulsifying agent and then polymerizing the butadiene hydrocarbon to form a latex-like emulsion.

2. Process which comprises emulsifying a hydrocarbon of the group consisting of butadiene-(1.3), isoprene and dimethylbutadienes with water and a salt of an organic base as an emulsifying agent and then polymerizing the hydrocarbon to form a latex-like emulsion.

3. Process which comprises emulsifying a butadiene-hydrocarbon with water and at least 1% of a salt of an organic base as an emulsifying agent and then polymerizing the hydrocarbon to form a latex-like emulsion.

4. Process which comprises emulsifying a hydrocarbon of the group consisting of butadiene-(1.3), isoprene and dimethylbutadienes with water and at least 1% of a salt of an organic base as an emulsifying agent and then polymerizing the hydrocarbon to form a latex-like emulsion.

5. Process which comprises emulsifying a butadiene-hydrocarbon with water and a salt of an organic base as an emulsifying agent and then polymerizing the butadiene-hydrocarbon at a temperature between about 40° and about 100° C. to form a latex-like emulsion.

6. Process which comprises emulsifying a hydrocarbon of the group consisting of butadiene-(1.3), isoprene and dimethylbutadienes with water and a salt of an organic base as an emulsifying agent and then polymerizing the hydrocarbon at a temperature between about 40° and about 100° C. to form a latex-like emulsion.

7. Process which comprises emulsifying a butadiene-hydrocarbon with water and at least 1% of a salt of an organic base as an emulsifying agent and then polymerizing the butadiene-hydrocarbon at a temperature between about 40° and about 100° C. to form a latex-like emulsion.

8. Process which comprises emulsifying a hydrocarbon of the group consisting of butadiene-(1.3), isoprene and dimethylbutadienes with water and at least 1% of a salt of an organic base as an emulsifying agent and then polymerizing the hydrocarbon at a temperature between about 40° and about 100° C. to form a latex-like emulsion.

9. The polymerization products obtainable according to the process claimed in claim 1, said products possessing rubber-like properties.

10. The polymerization products obtainable according to the process claimed in claim 2, said products possessing rubber-like properties.

11. The polymerization products obtainable according to the process claimed in claim 5, said products possessing rubber-like properties.

12. The polymerization products obtainable according to the process claimed in claim 6, said products possessing rubber-like properties.

13. Process which comprises polymerizing a compound of the formula:

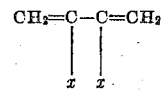

wherein $x$ means hydrogen or methyl, in emulsion with water and a salt of diethylamino-ethyl-oleylamide.

14. Process which comprises polymerizing a compound of the formula:

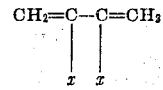

wherein $x$ means hydrogen or methyl, in emulsion with water and a salt of diethylamino-ethyl-oleylanilide.

15. Process which comprises polymerizing a compound of the formula:

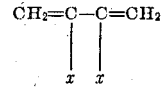

wherein $x$ means hydrogen or methyl, in emulsion with water and a salt of μ-pentadecylglyoxalidine.

WALTER BOCK. [L. S.]
EDUARD TSCHUNKUR. [L. S.]